US011611610B2

(12) United States Patent
Cambridge

(10) Patent No.: US 11,611,610 B2
(45) Date of Patent: Mar. 21, 2023

(54) SYSTEM AND METHOD FOR NOTIFICATION OF LISTENING DEVICES

(71) Applicant: McAfee, LLC, San Jose, CA (US)

(72) Inventor: Rodney Derrick Cambridge, Ruilsip (GB)

(73) Assignee: McAfee, LLC, San Jose, CA (US)

( * ) Notice: Subject to any disclaimer, the term of this patent is extended or adjusted under 35 U.S.C. 154(b) by 117 days.

(21) Appl. No.: 16/899,814

(22) Filed: Jun. 12, 2020

(65) Prior Publication Data

US 2021/0392183 A1 Dec. 16, 2021

(51) Int. Cl.

| | |
|---|---|
| *H04L 67/10* | (2022.01) |
| *H04W 4/21* | (2018.01) |
| *H04W 4/80* | (2018.01) |
| *G06T 19/00* | (2011.01) |
| *H04W 8/00* | (2009.01) |

(52) U.S. Cl.
CPC ............ *H04L 67/10* (2013.01); *G06T 19/006* (2013.01); *H04W 4/21* (2018.02); *H04W 4/80* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 10,057,125 B1* | 8/2018 | Roman | H04L 41/0883 |
| 10,362,033 B1* | 7/2019 | Saylor | H04W 4/80 |
| 2015/0080030 A1* | 3/2015 | Moldavsky | H04W 4/80 |
| | | | 455/456.3 |
| 2015/0373467 A1* | 12/2015 | Gelter | H04R 29/00 |
| | | | 381/56 |
| 2018/0113577 A1* | 4/2018 | Burns | G06F 3/0482 |
| 2018/0330589 A1* | 11/2018 | Horling | G05B 15/02 |
| 2019/0140892 A1* | 5/2019 | Jain | H04L 41/16 |
| 2020/0099545 A1* | 3/2020 | Hong | H04L 12/2803 |
| 2020/0221400 A1* | 7/2020 | Gorsica | H04W 4/80 |
| 2021/0056968 A1* | 2/2021 | Shreeshreemal | G10L 15/22 |

OTHER PUBLICATIONS

"Bluetooth—Wikipedia", Anonymous, Retrieved from the Internet: https://en.wikipedia.org/2/index.php?title=Bluetooth&oldid=961800364, retrieved on Jan. 25, 2021, pp. 1-34.
"Bluetooth Low Energy—Wikipedia", Anonymous, Retrieved from the Internet: https://en.wikipedia.org/2/index.php?title=Bluetooth_Low_Energy&oldid=957792365, retrieved on Sep. 1, 2021, pp. 1-15.
Extended European Search Report in European Patent Application No. 21175029.4 dated Nov. 5, 2021, 8 pages.

* cited by examiner

*Primary Examiner* — Hilina K Demeter
(74) *Attorney, Agent, or Firm* — Patent Capital Group

(57) ABSTRACT

There is disclosed in one example a computing apparatus, including: a hardware platform including a processor and a memory; a transceiver; a local user display; and instructions encoded within the memory to instruct the processor to: locate via the transceiver at least one nearby device; receive observational profile information for the nearby device; and display on the local user display information about the nearby device's observation abilities.

20 Claims, 13 Drawing Sheets

US 11,611,610 B2

SYSTEM AND METHOD FOR NOTIFICATION OF LISTENING DEVICES

FIELD OF THE SPECIFICATION

This application relates in general to computer security and privacy, and more particularly, though not exclusively, to providing a system and method for notification of listening devices.

BACKGROUND

Modern computing ecosystems may include devices with the ability to listen to and otherwise monitor activity in the environments in which they are used. This monitoring capability may result in concerns over privacy and security for individuals in those environments.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
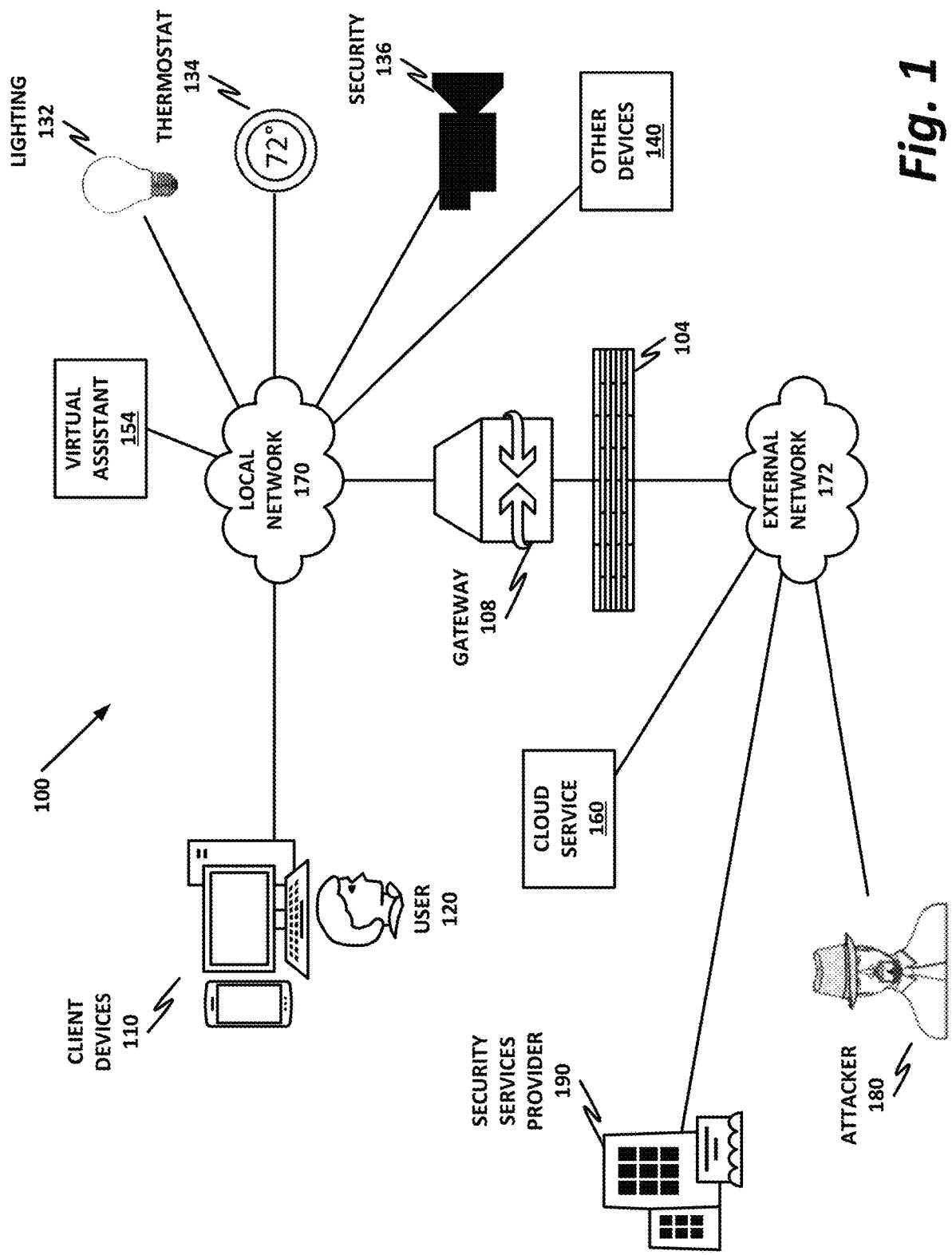
FIG. 1 is a block diagram of selected elements of a security ecosystem.

In an example, there is disclosed a computing apparatus, comprising: a hardware platform comprising a processor and a memory; a transceiver; a local user display; and instructions encoded within the memory to instruct the processor to: locate via the transceiver at least one nearby device; receive observational profile information for the nearby device; and display on the local user display information about the nearby device's observation abilities.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

With the modern ubiquity of smart phones, smart televisions, virtual assistants, laptops, desktops, and other "smart" devices, many users have become concerned about security and privacy. In particular, users may not always be aware of which devices are observing them, such as by listening, watching, or collecting other inputs that may be personal to the user.

There are many types of virtual assistants that listen to their surroundings with the intention of helping a user perform a specific task, such as listening to a song or scheduling an appointment. These virtual assistants operate on a natural language user interface, meaning they understand natural language voice commands from users, and are programmed to then take appropriate action. But as the popularity of these kinds of devices grows, so do the potential privacy concerns.

Virtual assistants are found not only in dedicated virtual assistant devices, such as Amazon Echo, Facebook Portal, Google Assistant, and similar, but also on cell phones, tablets, laptops, televisions, and other devices. The increasing number of virtual assistants means an increasing potential for multiple software agents to listen to an individual at any time. This may occur without the individual even knowing that they are being eavesdropped on. Privacy issues come into play as these agents can send portions of the speech that they detect up to the respective cloud systems for processing, without any interaction or notification. While some cloud service providers assure their users that uploaded data are anonymized, these assurances may not be sufficient for users, who may be aware that these same cloud service providers often generate a majority of their revenue from selling user data for targeted advertisements and other data mining operations.

Thus, it is desirable for users to be aware of the agents that might be listening to them and uploading their conversations, or portions of their conversations, to the cloud. Importantly, while the user of the device itself may have nominally agreed to this listening (often in a "shrink-wrapped" end user license agreement (EULA) that the user is unlikely to have actually read), other users in the environment may not have agreed to this. Nevertheless, devices may not be able to distinguish between users who have agreed and have not agreed to this monitoring. Thus, even users who have not agreed to the listening may have their privacy or security compromised.

As of the date of this patent, there is no legal or technical requirement for cloud service providers that provide these virtual assistants to notify users of the listening, or to provide individual opt-ins for users in the vicinity.

Thus, it is desirable to have a mechanism to notify users of what devices may be listening. Ideally, devices that perform this kind of observation would self-report both the fact that they are observing, and the nature of the observation, such as reporting audio, video, or other capabilities for monitoring the environment. However, absent a binding legal requirement, devices cannot always be relied upon to provide such self-reporting. As an interim measure, a technical standard may be introduced for devices to self-report their observational capabilities. While such a technical standard would not necessarily carry the full force of law, market forces could drive the adoption of the standard. If users refuse to purchase devices that do not comply with the standard, then devices that do comply may have a competitive advantage.

Such a standard may require listening devices to actively identify themselves, especially when they are in listening mode. This standard may be voluntary, but if consumers expect manufacturers to abide by the standard, then many of them may. Self-reporting of such a device may be done via a transceiver, which may be a low-power transceiver such as Bluetooth Low Energy (BTLE). BTLE is a useful transceiver because it has low power requirements, and thus may not cause a substantial burden on battery power, and also has enough range that it can reach devices that are generally within the ordinary observational or listening capabilities of a typical device. Self-reporting can also be provided in multiple tiers. For example, in a first tier, devices could self-report their overall observational capabilities and sensors, such as audio sensors, video sensors, environmental sensors, biometric sensors, and similar. Devices can also self-report which of these observational capabilities are currently active.

In another aspect, a computing device may be provided with a user agent on, for example, a smart phone, tablet, smart watch, smart glasses, or similar. The user agent may poll nearby devices with its own transceiver, such as polling nearby devices with BTLE. If these devices comply with the standard, they may self-report their observational capabilities, as well as which of those capabilities are currently active. The user agent may then drive a display to the user that advises the user of which devices are nearby, what their capabilities are, and which ones are currently active. Users can then react accordingly, such as by deciding whether to have particular conversations, whether to move to a different location, whether to modulate or moderate their discussions, lower their voices, move out of camera range, disengage from biometric sensors, or otherwise alter their behavior responsive to the observational capabilities of nearby devices.

In other embodiments, users may also be able to request that any listening devices exit their listening mode, or limit their observational capabilities. The force of this request may depend on whether the user is the owner of listening device, the severity of the invasion of privacy or security, or other factors.

In another embodiment, even devices that do not self-report their observational capabilities may nevertheless be identified. For example, the user agent may use a transceiver such as a Bluetooth transceiver to poll nearby devices for their device identifiers. Many of the listening devices that are of interest may self-identify a device identifier over a transceiver such as Bluetooth, even if they do not comply with the anticipated standard. For example, many of these devices have Bluetooth capabilities to connect to external speakers and microphones, or to external sources for their speakers and microphones. In this case, the user agent may poll nearby devices to determine their device identifiers, and may then query a cloud service with those device identifiers to determine the observational capabilities of the devices. While self-reporting may provide greater detail (e.g., whether the device is actively listening), even in the absence of self-reporting, devices that are a potential security or privacy risk can be identified. Once the devices have been identified by device identifier and by their observational capability, the user can make decisions about how to react to the presence of these devices, even though they do not self-report their observational capability or status. Indeed, the very fact that a device does not self-report its observational capability and/or status may be a factor in the user's determination of how to react. For example, the user may trust less a device that does not self-report.

Embodiments of the present specification operate with both self-reporting and non-self-reporting devices. These devices can self-report their observational capabilities, and whether they are currently in "listening mode" (or other observational mode). With this information, a user agent on the end user's device can poll nearby devices, determine their identities, build an observational profile for each device, and drive a display that provides a user-consumable indication of which devices are nearby and how they are acting.

For example, if nearby devices are identified that are known to not have observational capabilities (such as devices that are not network-connected), they may appear as "green" devices with no or minimal privacy implications. Devices that self-report observational capabilities, but that also self-report that they are not currently in listening mode may appear with a "yellow" indicator. Devices that either do not self-report, or that self-report that they have observational capabilities and are currently in listening mode may appear with a "red" indicator, indicating that the user should exercise greater caution around these devices, and may want to make decisions about how to respond.

In one illustrative embodiment, an augmented reality view may provide the user with a visual indication of nearby devices, the location of those nearby devices, and the status of each device. In another embodiment, a list view may simply identify nearby devices according to their identifiers and observational profiles. In yet another embodiment, a hybrid view can be provided with both a list and an augmented reality. Many other types of displays are possible, and are intended to be encompassed within the scope of the present specification.

Advantageously, the teachings of the present specification address a privacy issue that only increases in severity as the number of virtual assistants and software agents used by consumers increases. As of the date of this patent, there appear to be no controls or restrictions as to where or how these devices can operate, whether or how they self-report, and what data they collect, whether they anonymize it, or whether they have any protections for user privacy or security.

Many individual users specifically trust or mistrust a particular company over another company when it comes to virtual assistants. For example, some users may trust Apple's Siri but not Google's Assistant. Other users may trust Google's Assistant but not Apple's Siri. Yet other users may have a preference for Amazon Alexa, Samsung Bixby, or other virtual assistants.

A user who trusts Apple but not Google may choose to purchase an Apple device instead of a Google device running Google Assistant. This user may not want to have a device with Google Assistant listening in on their conversations. But if the user is in the vicinity of another person's Google Assistant device (such as a work colleague, family member, friend, or other), then their conversations might be captured by the Google Assistant anyway, without their consent and even without their realization. Similarly, users who trust or distrust other companies' virtual assistants may find that their conversations are captured by the untrusted companies. And some users do not trust any of these companies with their personal data, and would prefer not to have conversations within the range of any virtual assistants that may listen. Indeed, some of these users may go to great lengths to disable any such virtual assistant on their own phone or personal device, and may avoid other users of virtual assistants.

Many voice-activated virtual assistants may require a trigger phrase, such as "hey, Siri" or "okay, Google," to start the listening process. This may appear to the end user to make it easier to determine when the device begins listening. However, this is not always a reliable indicator. These assistants may be put into listening mode in more discrete ways, such as by pressing or holding a button on the device, by a motion activation, by an accelerometer, or by other means. Furthermore, some of these devices may not respond absent the trigger phrase, but may nevertheless listen in on conversations even without the trigger phrase. These conversation data may be uploaded to the operator's cloud service, where they can be analyzed by the cloud service and used to improve the quality of the virtual assistant (or for any other use), without users realizing that they have given consent to such monitoring in a legally dense, shrink-wrapped EULA. The operator's assurances that these data are anonymized and completely separated from identification of the users themselves may not be sufficient to assure some users.

Furthermore, as technology progresses, trigger words may become a less rigid requirement for future devices. All of this makes it increasingly difficult for users to know when a device is eavesdropping on them, or actively listening to a conversation. The system and method described in the present specification help to alleviate users' privacy and security concerns by notifying them of which devices nearby may be listening, and which ones self-report that they are currently listening.

BTLE is disclosed herein as an embodiment of a transceiver that fulfills the dual purposes of providing a minimal load on a user's battery power, while also having sufficient range to identify devices that are within a reasonable listening radius. For example, BTLE may be able to identify devices within a range of approximately 1 to 3 meters. New smart phones in development may also make use of ultra-wideband (UWB) technology, which provides even more precise indoor localization. Other transceiver technologies may be used for device-to-device communication, and many such technologies are known, including infrared (IR), radio frequency (RF), Bluetooth, Wi-Fi, and others.

In an ecosystem in which self-reporting is common or nearly universal, virtual assistants that have been placed in listening mode, either through a voice trigger, a hardware or software button, some other trigger, or for collecting telemetry, may announce via the transceiver that they are in listening mode. Advantageously, announcing via the transceiver may be less intrusive to users than announcing via, for example, a synthesized voice. In this case, users who are interested in knowing every single time the device enters any kind of listening mode can see it on a smart phone or other device, but those who are apathetic to the listening do not need to be bothered with the device announcing itself every time it begins collecting data.

In an embodiment, the broadcast announcement that the device is in listening mode may be made on a regular basis, for example every 10 seconds while the device is in listening mode. These announcements may be made via a transceiver such as BTLE to the local environment with a range, for example, of 10 to 20 meters.

In an embodiment, the announcement may contain the broadcasting product name/description (e.g., "John's Samsung Galaxy S10"), the listening duration (for example, "listening for 40 seconds"), and the location, such as via global positioning system (GPS) latitude or longitude, UWB, or via other means.

In this context, "locating" a device may mean locating it with precision (e.g., with ultra-precise GPS coordinates), or it may simply mean determining that the device is within range of a BTLE or other transceiver announcement. Very precise locations may be useful for augmented reality displays, while less precise locations may be useful for list displays. A user agent may listen for these announcements on a regular basis and then relay the information to the user via a display such as augmented reality, a list, or other.

In cases where devices do not self-report, then telemetry data may be collected via Bluetooth, radiofrequency, Wi-Fi, or other means to determine which devices are nearby, and which devices are not self-reporting. In that case, the user agent may query a cloud service for the device identifier, and the cloud service may maintain a global database of known devices and their observational capabilities.

After observing the displayed information, the user can decide whether to change their behavior or take action, such as by modulating their conversation accordingly, electronically requesting the device to exit listening mode, politely requesting a friend, acquaintance, or family member to turn off the listening device, or removing themselves from the vicinity.

A system and method for providing notification of listening devices will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network-connected vehicles.

Virtual assistant 154 may also be connected to local network 170. Virtual assistant 154 may be a standalone device, or may be connected with one or more client devices 110. For example, virtual assistant 154 could be a Facebook Portal, an Amazon Echo, a device driven by Apple's Siri or Google's Assistant, or any other similar virtual assistant. It could also be an application such as Siri, Assistant, Amazon's Alexa, Samsung's Bixby, Microsoft's Cortana, or similar on a cell phone, tablet, desktop, laptop, or other device.

As described above, virtual assistant 154 may include observational capabilities, such as microphones, speakers, biometric sensors, ambient sensors, or other sensors and peripherals that enable virtual assistant 154 to observe users, including visually, listening to conversations, reacting to trigger phrases, answering questions, or performing other activities. Virtual assistant 154 may not always report to user 120 when it is, for example, listening to a conversation or otherwise observing.

Furthermore, virtual assistant 154 may also periodically collect telemetry data for cloud service 160. The telemetry data can help cloud service 160 to improve its services, such as by improving the artificial intelligence (AI) driver that operates virtual assistant 154. It can also help improve voice recognition and other features. However, cloud service 160 is essentially on the honor system with respect to not spying on user 120, and keeping a database of conversations and activities of user 120. For example, virtual assistant 154 may periodically record snippets of ambient conversation, anonymize the data, and upload the data to cloud service 160. However, there is no technical requirement for virtual assistant 154 to anonymize the data, and currently there is no known legal requirement to do so. Thus, cloud service 160 could just as easily not anonymize the data, and could periodically spy on user 120, including capturing intimate conversations, conversations that may be deemed illegal, or even conversations that could be used for blackmail or coercion.

An attacker 180 could gain access to this information. In this context, attacker 180 could be broadly construed. For example, cloud service 160 could itself act as attacker 180, in which case cloud service 160 could gather intelligence on user 120, and then use that intelligence for its own ends. Attacker 180 could also be a government entity, which may try to subpoena records from cloud service 160, or try to use a warrant, or operating without a warrant, try to coerce cloud service 160 into spying on user 120, despite the terms of service and the ordinary practice of anonymizing the data. In another context, attacker 180 could be a malicious actor who breaches the security of cloud service 160 and gains access to large archives of data. Again, cloud service 160 is not technically compelled to anonymize the collected data, and indeed, in some cases, government agencies could try to legally compel cloud service 160 to not anonymize the data.

Thus, virtual assistant 154, while providing many useful features for user 120, may become a serious privacy or security aperture for the user's environment. Furthermore, if a friend, neighbor, or family member comes to visit user 120, then virtual assistant 154 could spy on this user without the user even knowing. It is therefore advantageous to have a mechanism to detect the presence of virtual assistant 154, and to receive a self-reported or non-self-reported indication of the listening or observational activity.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
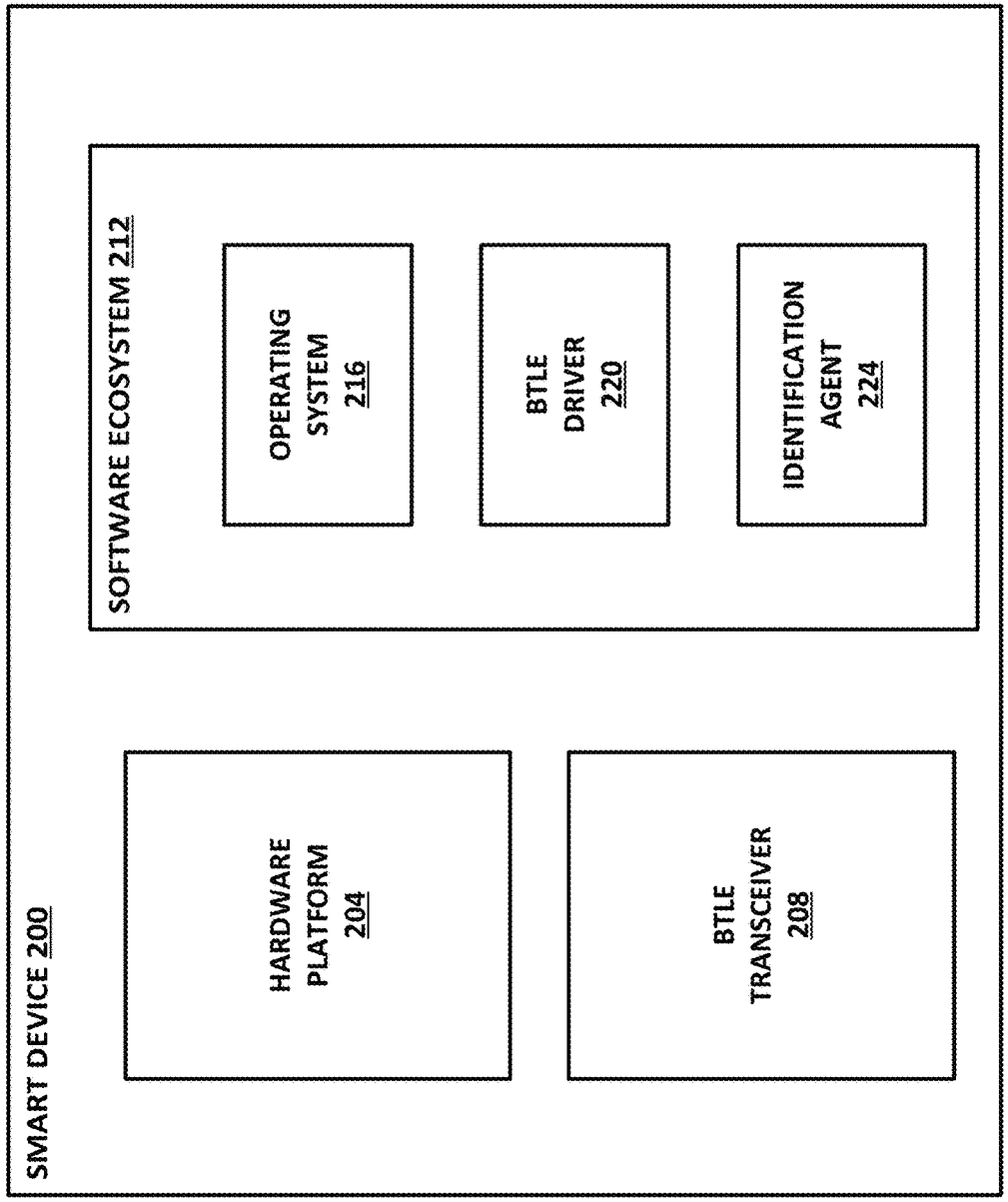
FIG. 2 is a block diagram illustration of a smart device.

FIG. 2 is a block diagram illustration of a smart device 200, which may be for example a virtual assistant or other smart device. Smart device 200 includes a hardware platform 204 which may include, for example, a processor and/or memory. Nonlimiting and illustrative examples of hardware platforms are provided in FIGS. 10-13 below.

Smart device 200 may also include a transceiver, such as a BTLE transceiver 208, or some other transceiver, such as a UWB transceiver, Wi-Fi, RF, or other transceiver that can communicate with nearby devices.

Smart device 200 includes a software ecosystem 212. This includes an operating system 216, which in many cases is a customized operating system that provides device-specific functionality. This is particularly true in the case of a dedicated virtual assistant like Amazon Echo or Facebook Portal. If the virtual assistant is a software feature of a general use device, then operating system 216 may be a more general operating system, such as Microsoft Windows, Apple OS X, Apple iOS, Android, or other.

A software BTLE driver 220 includes logic to enable operating system 216 and other software to communicate with BTLE transceiver 208.

Identification agent 224 is used to self-report certain identification information. This self-reported information may be a standards-compliant report, in which smart device 200 self-reports its own identification, its observational capabilities, its current observational state, or other detailed information about observation. This is in the case of a standard that is widely adopted and that users expect manufacturers to follow, in which devices self-report. In the absence of such a standard, or in the case where manufacturers choose not to follow this standard, many devices still provide some kind of self-reporting.

For example, if a device operates on a wireless or Ethernet network, it generally reports a media access control (MAC) address and a device name. If a device operates on Bluetooth, it usually reports some Bluetooth device identifier. Other communication protocols include different identification reports. In the absence of a standard, or in cases where devices do not follow the standard, this less detailed self-reporting can nevertheless be used to query a cloud-based or local database to determine the identity and nature of the device, and at least to look up the expected observational capabilities of the device.

Figure 3:
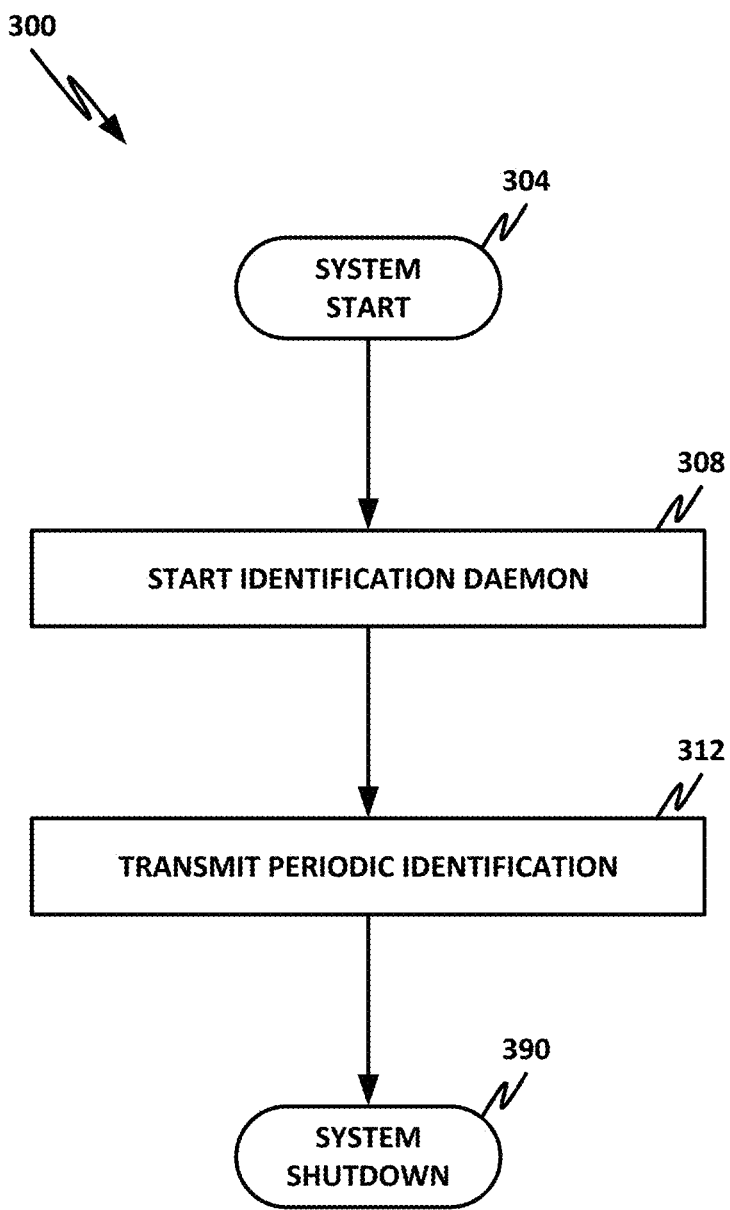
FIG. 3 is a flowchart of a method.

FIG. 3 is a flowchart of a method 300. Flowchart 300 includes an illustrative example of an algorithm that may provide device self-reporting. This algorithm may be carried out, for example, by identification agent 224 of FIG. 2, or any other appropriate agent consistent with this specification.

In block 304, the system starts. This may include, for example, the operating system starting up at the device bootup.

At block 308, an identification daemon begins running, for example, as a background process or other periodic process.

In block 312, the device transmits a periodic identification. This periodic identification transmission may continue for a given amount of time. For example, it may continue as long as the device is operational. In other examples, the periodic identification may continue only for so long as the device is in an active listening or observational mode. Other boundaries for when and how to identify may be set. The periodic identification may be on any appropriate period, such as every 10 seconds, every minute, or some other identification period.

In block 390, once operation is complete, the system shuts down.

Figure 4:
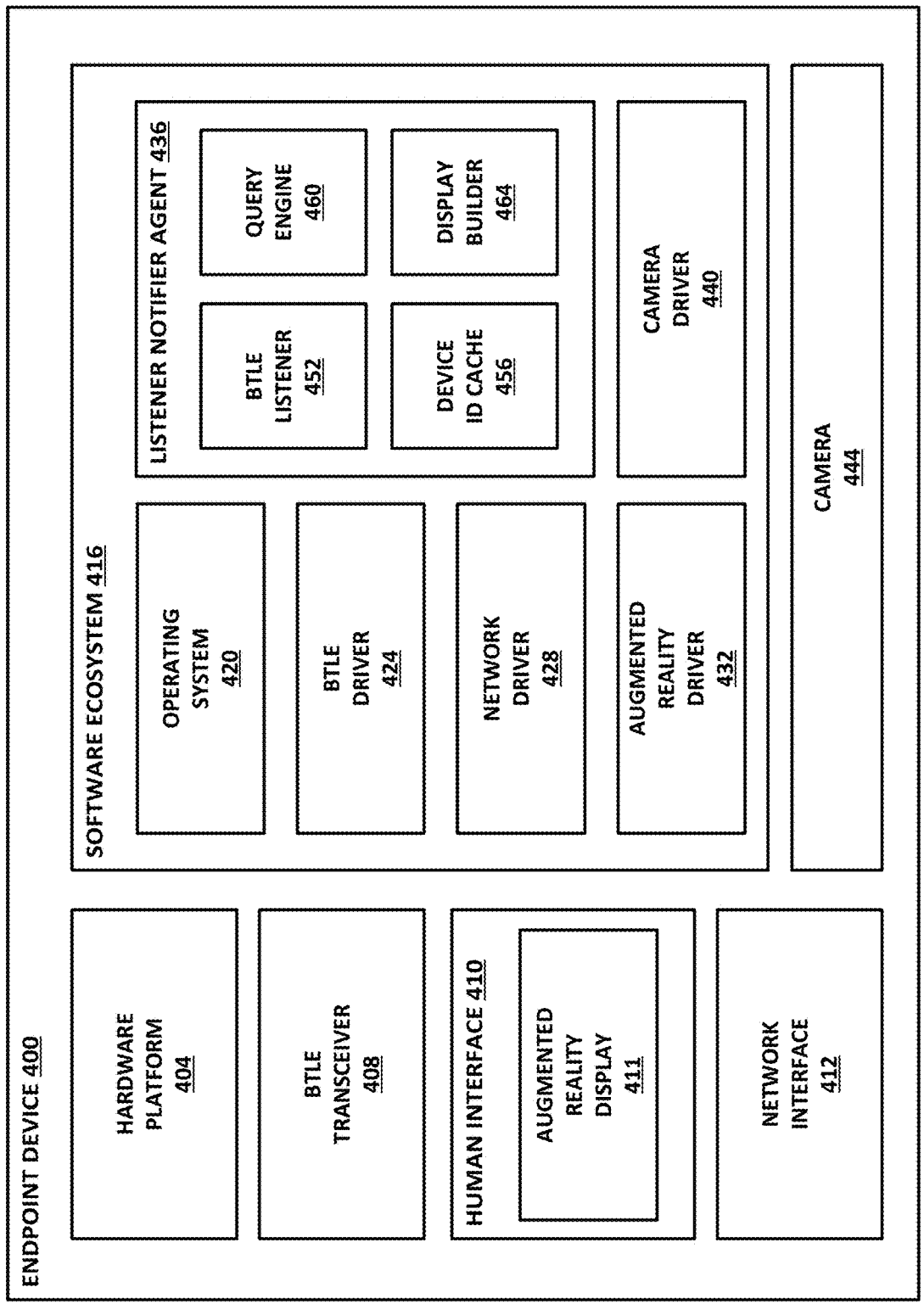
FIG. 4 is a block diagram illustration of an endpoint device.

FIG. 4 is a block diagram illustration of an endpoint device 400. Endpoint device 400 may be, for example, a user's smart phone, tablet, laptop, desktop, or other endpoint device that the user operates, and which may provide identification features consistent with the present specification. For purposes of illustration, endpoint device 400 will be treated as a smart phone with an augmented reality display. This should be understood to be a nonlimiting example, and any other suitable configuration is available.

Endpoint device 400 includes a hardware platform 404, such as one of the hardware platforms illustrated in FIGS. 10-13, or any other suitable hardware platform. Endpoint device 400 also includes a BTLE transceiver 408, or some other transceiver that can be used to identify, locate, and/or communicate with nearby devices.

Endpoint device 400 has a human interface 410, which may include human input/output devices. This can include, in various devices, a touchscreen, which acts as a combined input and output device, or standalone input or output devices, such as a monitor, keyboard, mouse, software keyboard, speakers, indicator lights, and other input/output options. In some embodiments, human interface 410 includes a display which may be an augmented reality display. For example, hardware platform 404 could include a camera 444 for a smart phone, which can then be used to drive a real-time display of the user's current ambient environment. Data can be overlaid on that real-time display to provide an augmented reality display as illustrated, for example, in FIG. 8. Human interface 410 may also include other displays, such as a list display, a map interface, or other display options.

Endpoint device 400 may also include a network interface 412 which could be used, for example, to communicate with a cloud service in cases where nearby devices do not provide sufficient self-reporting. Network interface 412 may also provide a traditional network stack, and may provide many other rich networking features, including web browsing, online gaming, a business virtual private network (VPN), and other network functions.

Endpoint device 400 also includes a software ecosystem 416. Software ecosystem 416 includes an operating system 420, which may be any suitable operating system as described above.

A BTLE driver 424 provides communication between operating system 420 and other software, and BTLE transceiver 408.

Network driver 428 provides the network stack and software network connections to hardware network interface 412. Augmented reality driver 432 may include the necessary logic and/or algorithms to drive a display to augmented reality display 411. This can include, for example, capturing real-time imagery with camera 444, and overlaying additional information or images onto the real-time display to supplement the display.

Camera driver 440 includes logic to interface with camera 444.

Listener notifier agent 436 may include several software sub-units that carry out various algorithms according to the present specification. An algorithm for an illustrative example of a listener notifier agent 436 is provided in flowchart 500 of FIG. 5. This algorithm is provided as an illustrative algorithm, and any other suitable algorithm may be used.

In this example, listener notifier agent 436 includes sub-modules such as a BTLE listener 452, a device ID cache 456, a query engine 460, and a display builder 464. In an illustrative embodiment, BTLE listener 452 listens via BTLE driver 424 on BTLE transceiver 408 to identify, locate, or otherwise enumerate nearby devices that may be in an observational or listening mode. Depending on the level of self-identification of these devices, it may or may not be necessary to augment that information. In cases where it is desirable to augment the self-reported information, query engine 460 may operate via network driver 428 and network interface 412 to communicate with a cloud service provided by a security services provider, such as security services provider 190 of FIG. 1.

The security services provider may provide additional information about nearby listening devices. For example, the global or cloud-based database may include a device ID database, and the observational capabilities associated with those devices, even if they do not self-report those observational capabilities. It could also include, for example, warnings of devices that are known to enter listening or observational mode without notifying the user, or that frequently enter such a mode without explicit user interaction, or with an accidental user interaction.

Device ID cache 456 may be used to cache recently queried devices, so that a new query does not have to be sent up to the cloud every time the device is encountered. Data within device ID cache 456 may, in some examples, include a time to live (TTL), in which case the cached data may be purged once the TTL expires. This can help to ensure that the cached data do not become stale, for example, when new capabilities of a known device may be discovered. A common TTL for a cache may be on the order of approximately 24 hours, although any other TTL may be used.

Display builder 464 may be used to build a display that may be driven via augmented reality driver 432 out to augmented reality display 411. This augmented reality display can notify the user of nearby devices, whether they are listening, how long they have been listening, or other information about the devices.

Figure 5:
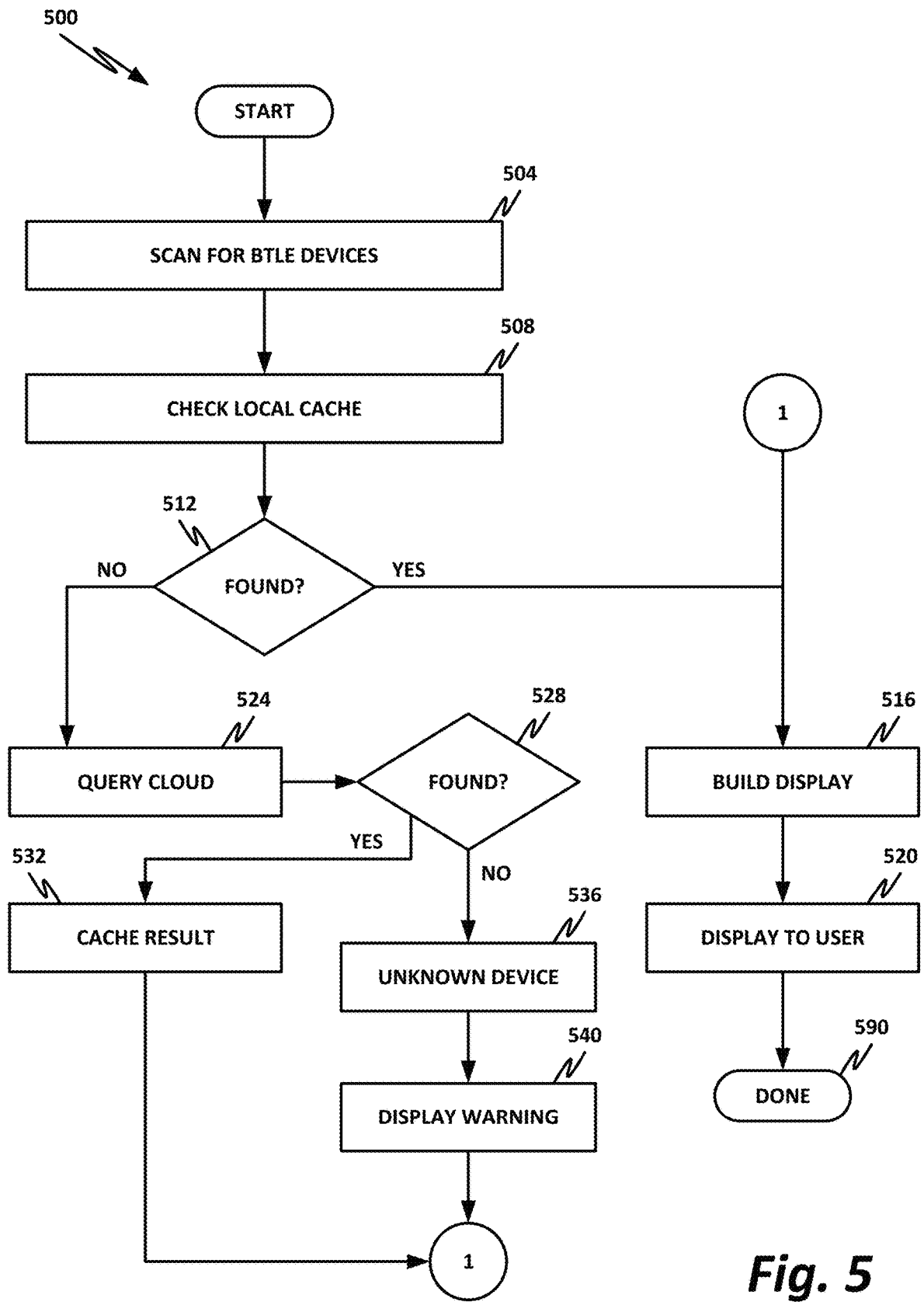
FIG. 5 is a flowchart of an additional method.

FIG. 5 is a flowchart of a method 500. Flowchart 500 illustrates one illustrative algorithm that may be carried out, for example, by a listener notifier agent such as listener notifier agent 436 of FIG. 4, or any other suitable agent or engine as described in the present specification.

Starting in block 504, the agent may first scan for nearby BTLE devices, for example, using a BTLE transceiver. BTLE is provided as a nonlimiting and illustrative example, and any other suitable transceiver communication device may be used.

In block 508, once a device or devices have been identified, the agent checks the local cache for a cached identifier of the device.

In block 512, if the device is found in the local cache, then there is sufficient cached information to build a display. Note that checking for additional cached information may be necessary only if self-reported information by the nearby BTLE or other devices is not sufficient to provide the desired display.

In block 516, with the suitable display information provided, the agent builds the display, such as by overlaying information about nearby BTLE devices, their self-reported capabilities, and augmented data retrieved from the cloud onto a real-time camera display.

In block 520, the information is displayed to the user, and in block 590, the method is done.

Returning to decision block 512, if there is insufficient self-reported information, and the device identifier was not found in the local device ID cache, then it may be necessary or desirable to query a cloud service to obtain additional information about the nearby device.

In block 524, the agent queries the cloud to determine whether there is additional information available about the identified device.

In block 528, if additional data about the device are found, then in block 532, the results may be cached in the local device cache. Control may then flow to block 516, as previously described.

Returning to decision block 528, if the device is not found in the database, then the device is treated in block 536 as an unknown device.

In block 540, in the case of an unknown device, the agent may at least display a warning indicating that a nearby device has been identified or enumerated, and that its listening capabilities could not be determined. Control may then flow to block 516 as before, and in block 590, the method is done.

Figure 6:
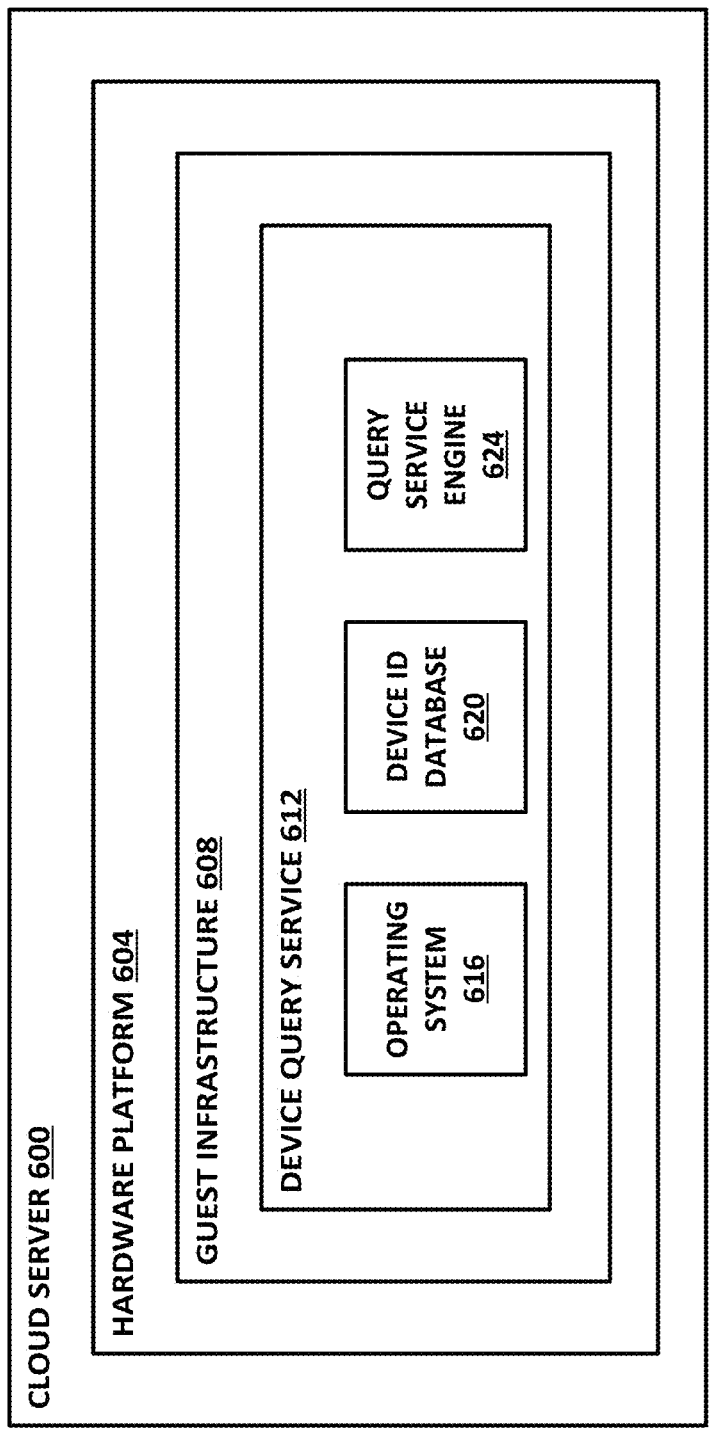
FIG. 6 is a block diagram illustration of a cloud server.

FIG. 6 is a block diagram illustration of a cloud server 600. Cloud server 600 is provided on a hardware platform 604, which may include any of the hardware platforms disclosed herein. In particular, reference is made to the hardware platform and virtualization infrastructure of FIG. 13.

Hardware platform 604 provides a guest infrastructure 608, which may include, for example, virtualization or containerization. In the particular case of virtualization, a processor and memory may be provided that are virtualized, but that ultimately map to a physical processor and physical memory of hardware platform 604. Thus, a processor or memory, as claimed in the claims below, should be understood to include a virtualized processor and memory that are instantiated on a physical hardware device.

Running on guest infrastructure 608 is a device query service 612. Device query service 612 may be, for example, a virtual machine or a container that includes the logic and instructions to provide device query service 612. In this illustration, device query service 612 includes a number of software modules or objects, including an operating system 616, a device ID database 620, and a query service engine 624. Operating system 616 may be any suitable operating system, and commonly may be a server class operating system, such as a Linux or Berkeley Software Distribution (BSD) server operating system, Microsoft Windows Server, or some other operating system, such as a VMware operating system built for custom virtualization.

A device ID database 620 may include a global database of known devices, along with their known observational capabilities, tendencies, and other information about the devices.

Figure 7:
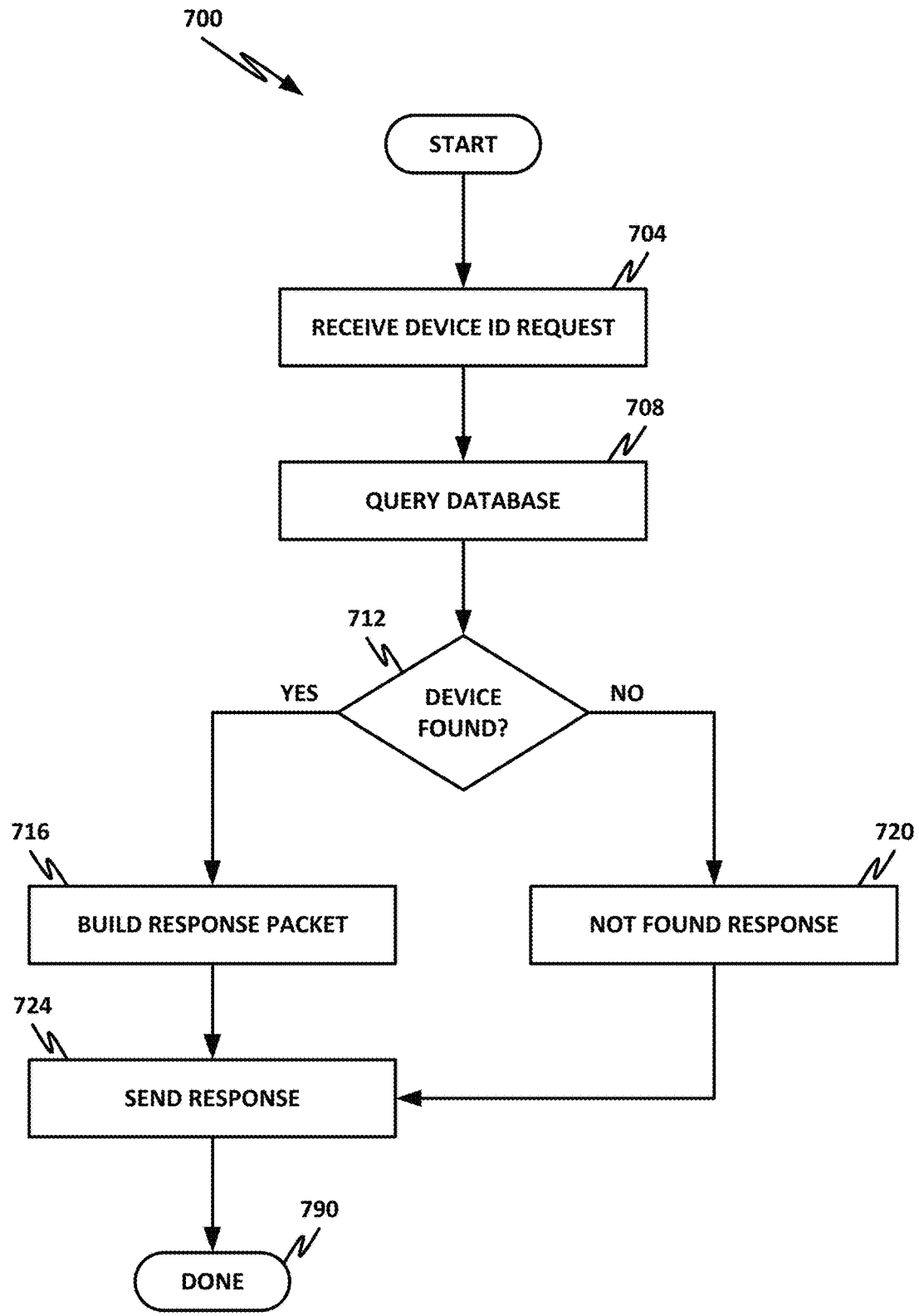
FIG. 7 is a flowchart of an illustrative embodiment.

Query service engine 624 may be provided by software that implements an algorithm, such as the method of flowchart 700 of FIG. 7.

Turning to FIG. 7, flowchart 700 provides an illustrative embodiment of a function that may be provided, for example, by query service engine 624 of FIG. 6.

Starting in block 704, the engine receives a request for device identification, for example, via a network interface. The request may come from an endpoint device that wishes to either retrieve observational capability profile information on a device that did not self-report its own observational capabilities, or alternatively, the endpoint device may request supplemental information for a device that did self-report, but in a context where additional supplemental information may be valuable.

In block 708, the engine queries its global device ID database for the provided device ID, to determine whether there is available information on the device or class of devices that the device belongs to.

In decision block 712, the engine determines whether the device ID was found. If no device ID was found, then in block 720, the engine responds that the device could not be found, and the endpoint device may act accordingly.

Returning to decision block 712, if the device is found, then in block 716, the engine may build a response packet, for example, by extracting from the database records or information correlated with the device ID.

In block 724, the engine sends the response to the endpoint device.

In block 790, the method is done.

The observational profile information that may be associated with an individual device may include a wide variety of factors associated with the device. For example, the observational profile information could include whether the device is equipped with a microphone and/or camera, whether the device commonly operates with software that uses the microphone and/or camera to monitor activity, whether the device has trigger phrases, whether the device has the capability to trigger listening without a trigger phrase, whether the device collects telemetry data (including recording conversations or activity), and whether the provider has agreed to anonymize such telemetry data. The observational profile information may also include information or warnings about known violations of these agreements, cases where the provider has been subpoenaed to provide private user information, data breaches associated with the provider, or other information. Because these rich global data can be collected independently of the device itself, it may be advantageous to supplement observational profile data even in cases where the device self-reports its own observational abilities. For example, if a device self-reports that it is listening, the self-reporting may be supplemented with information from the cloud indicating that the provider has recently suffered a data breach, is known to behave irresponsibly with data, has been the subject of subpoenas, or other information that is not generally self-reported by the device.

Figure 8:
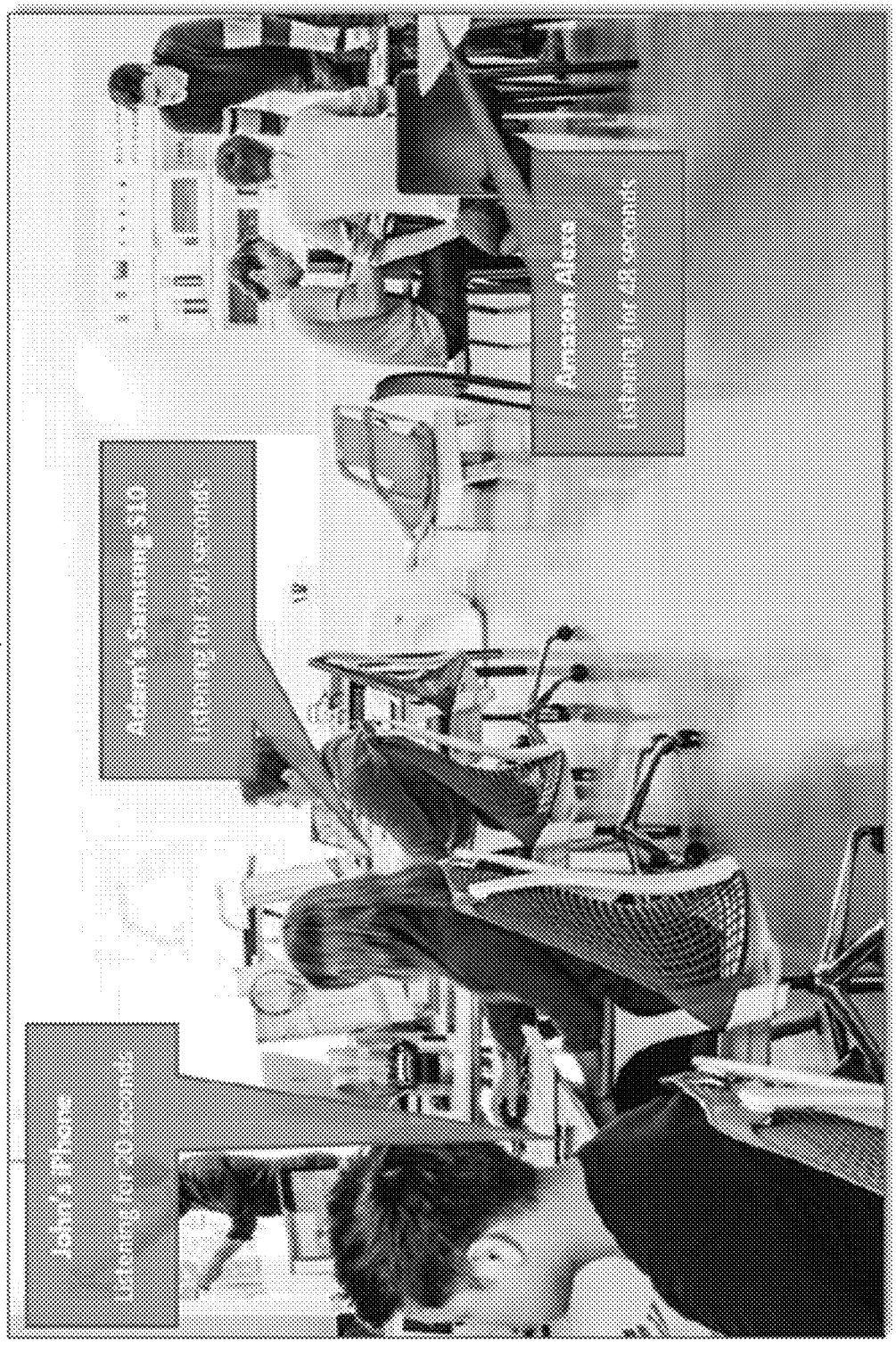
FIG. 8 is an illustration of an example augmented reality view.

FIG. 8 is an illustration of an example augmented reality view that may be provided in an embodiment of the present specification. In augmented reality view 800, a camera provides a real-time display of the ambient environment. In this case, the user may be sitting, for example, in a computer lab at a workplace, surrounded by other employees who may also have smart devices or virtual assistants. In this case, the augmented reality view indicates that several devices may be listening. For example, a device that has self-identified as "John's iPhone" self-reports that it has been listening for 20 seconds, a device that identifies itself as "Adam's Samsung S10" self-reports that it has been listening for 320 seconds, and a device that identifies itself as "Amazon Alexa" self-reports that it has been listening for 48 seconds. In addition to these self-reported values, augmented reality view 800 could include devices that were located that did not self-report listening activity, devices that were located that include supplemental data received from the cloud, and/or supplemental data for devices that did self-report, by way of illustrative and nonlimiting example.

Figure 9:
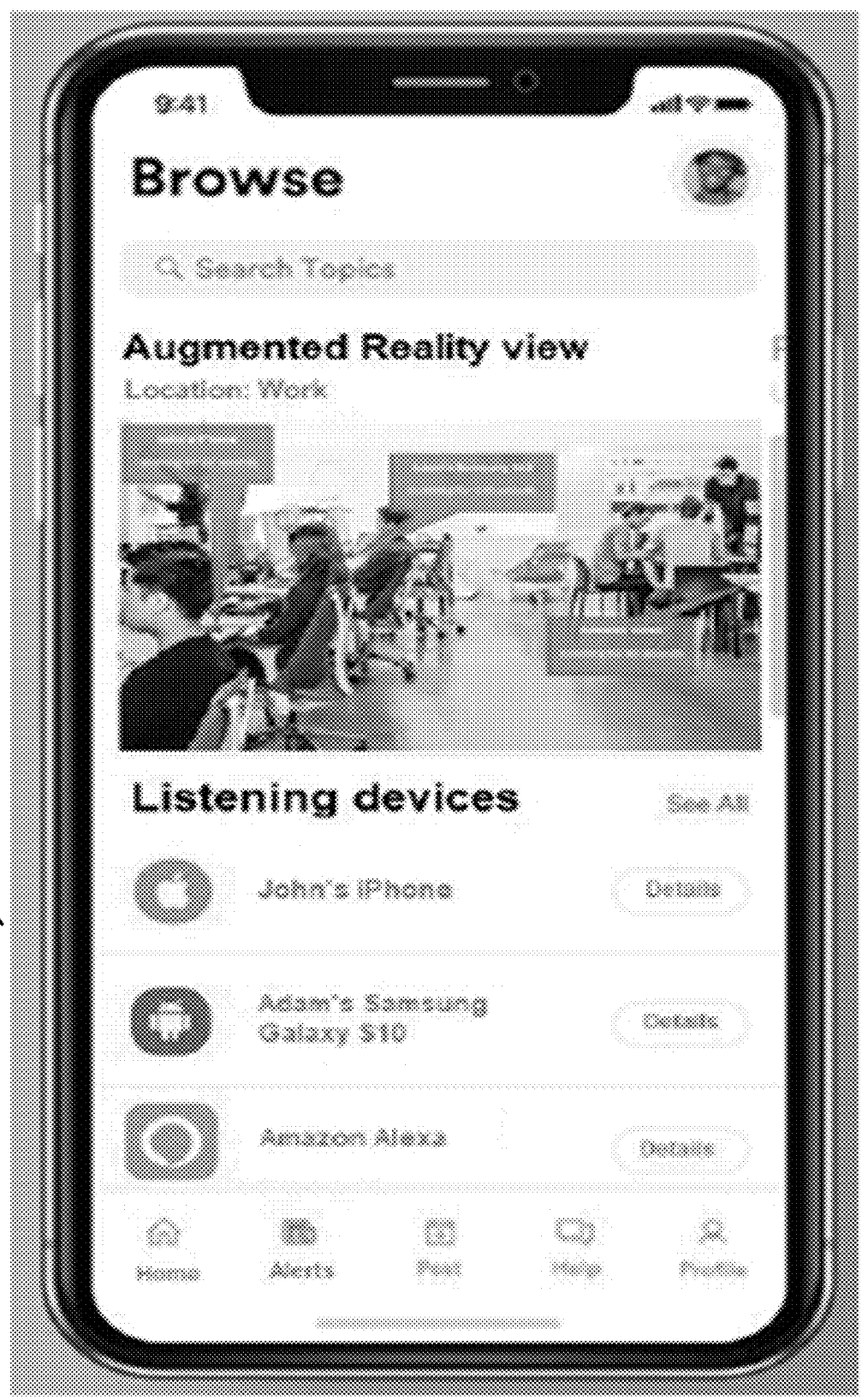
FIG. 9 is an illustration of an alternative hybrid view.

FIG. 9 is an illustration of an alternative hybrid view 900. In this example, a list view provides a list of devices that were identified, with an option to click for more details. In this case, the hybrid view 900 also includes the augmented reality view, although a pure list view could also be provided.

Figure 10:
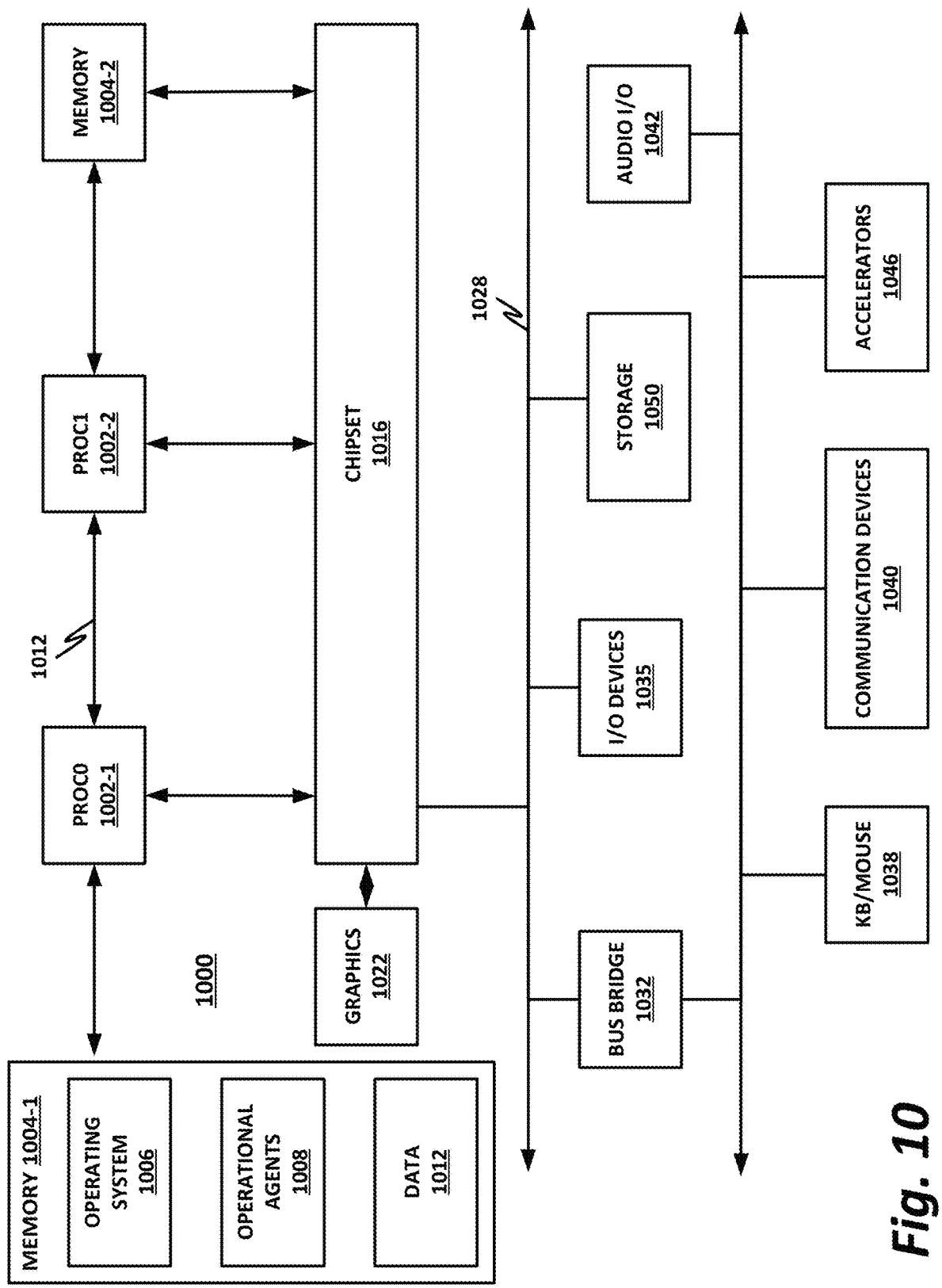
FIG. 10 is a block diagram illustration of selected elements of a hardware platform.

FIG. 10 is a block diagram illustration of a hardware platform 1000. In at least some embodiments, hardware platform 1000 may be configured or adapted to provide notification of listening devices, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1000, even though they may be scattered across a data center, or even located in different data centers.

Hardware platform 1000 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1000 is arranged in a point-to-point (PtP) configuration. This PtP configuration is popular for personal computer (PC) and server-type devices, although it is not so limited, and any other bus type may be used.

Hardware platform 1000 is an example of a platform that may be used to implement embodiments of the teachings of this specification. For example, instructions could be stored in storage 1050. Instructions could also be transmitted to the hardware platform in an ethereal form, such as via a network interface, or retrieved from another source via any suitable interconnect. Once received (from any source), the instructions may be loaded into memory 1004, and may then be executed by one or more processor 1002 to provide elements such as an operating system 1006, operational agents 1008, or data 1012.

Figure 12:
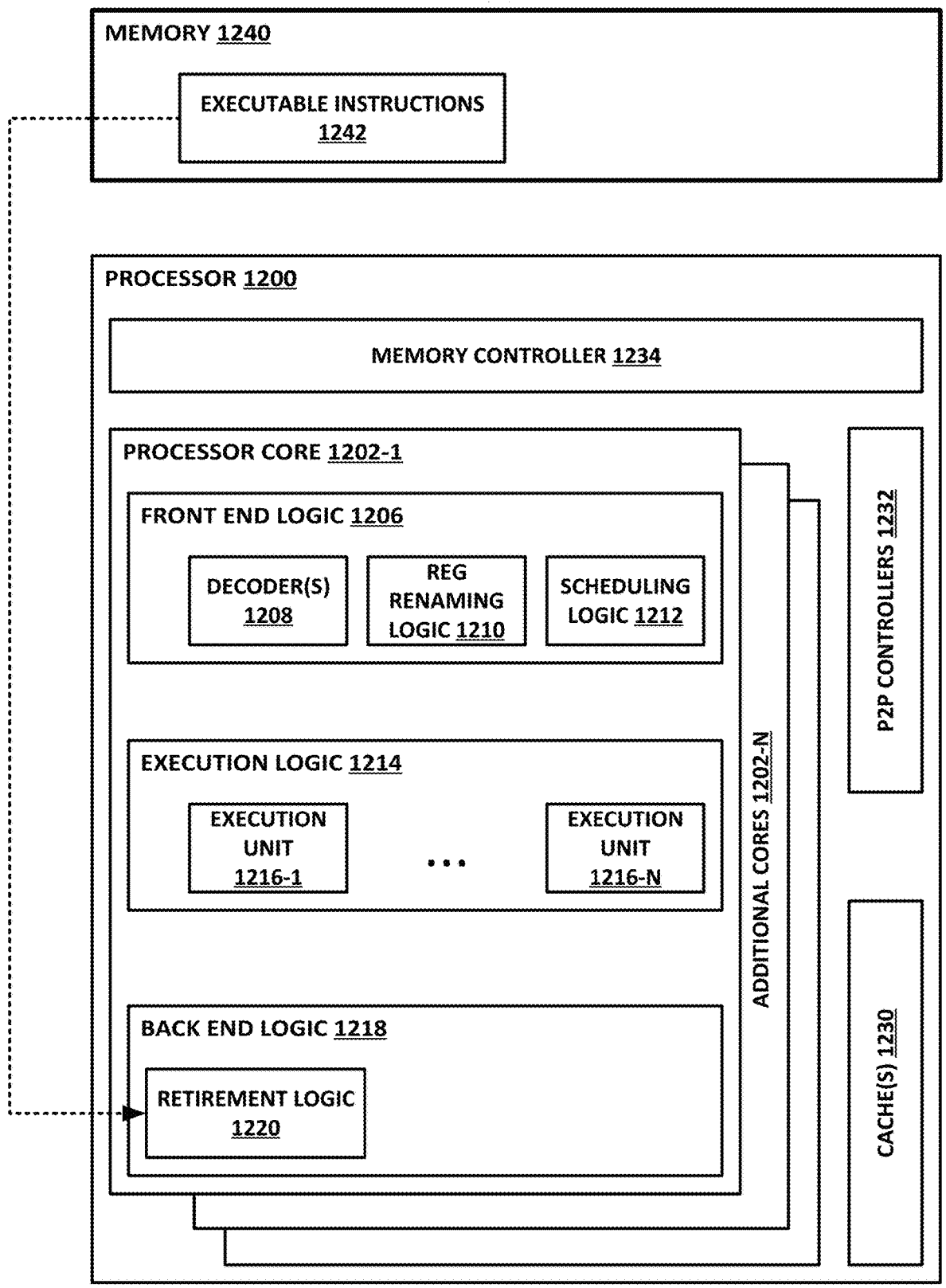
FIG. 12 is a block diagram illustration of selected elements of a processor.

Hardware platform 1000 may include several processors 1002. For simplicity and clarity, only processors PROC0 1002-1 and PROC1 1002-2 are shown. Additional processors (such as 2, 4, 8, 16, 24, 32, 64, or 128 processors) may be provided as necessary, while in other embodiments, only one processor may be provided. Details of processors 1002 are not illustrated in this FIGURE, but one embodiment is illustrated in FIG. 12. Processors may have any number of cores, such as 1, 2, 4, 8, 16, 24, 32, 64, or 128 cores.

Processors 1002 may be any type of processor and may communicatively couple to chipset 1016 via, for example, PtP interfaces. Chipset 1016 may also exchange data with other elements, such as a high performance graphics adapter 1022. In alternative embodiments, any or all of the PtP links illustrated in FIG. 10 could be implemented as any type of bus, or other configuration rather than a PtP link. In various embodiments, chipset 1016 may reside on the same die or package as a processor 1002 or on one or more different dies or packages. Each chipset may support any suitable number of processors 1002. A chipset 1016 (which may be a chipset, uncore, Northbridge, Southbridge, or other suitable logic and circuitry) may also include one or more controllers to couple other components to one or more central processor units (CPUs).

Two memories, 1004-1 and 1004-2 are shown, connected to PROC0 1002-1 and PROC1 1002-2, respectively. As an example, each processor is shown connected to its memory in a direct memory access (DMA) configuration, though other memory architectures are possible, including ones in which memory 1004 communicates with a processor 1002 via a bus. For example, some memories may be connected via a system bus, or in a data center, memory may be accessible in a remote DMA (RDMA) configuration.

Memory 1004 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1004 may be used for short, medium, and/or long-term storage. Memory 1004 may store any suitable data or information utilized by platform logic. In some embodiments, memory 1004 may also comprise storage for instructions that may be executed by the cores of processors 1002 or other processing elements (e.g., logic resident on chipsets 1016) to provide functionality.

In certain embodiments, memory 1004 may comprise a relatively low-latency volatile main memory, while storage 1050 may comprise a relatively higher-latency non-volatile memory. However, memory 1004 and storage 1050 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1004 and storage 1050, for example, in a single physical memory device, and in other cases, memory 1004 and/or storage 1050 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1022 may be configured to provide a human-readable visual output, such as a command-line interface (CLI) or graphical desktop such as Microsoft Windows, Apple OSX desktop, or a Unix/Linux X Window System-based desktop. Graphics adapter 1022 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1022 may include a hardware graphics card, which may have its own memory and its own graphics processing unit (GPU).

Chipset 1016 may be in communication with a bus 1028 via an interface circuit. Bus 1028 may have one or more devices that communicate over it, such as a bus bridge 1032, I/O devices 1035, accelerators 1046, communication devices 1040, and a keyboard and/or mouse 1038, by way of nonlimiting example. In general terms, the elements of hardware platform 1000 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1040 can broadly include any communication not covered by a network interface and the various I/O devices described herein. This may include, for example, various universal serial bus (USB), FireWire, Lightning, or other serial or parallel devices that provide communications.

I/O Devices 1035 may be configured to interface with any auxiliary device that connects to hardware platform 1000 but that is not necessarily a part of the core architecture of hardware platform 1000. A peripheral may be operable to provide extended functionality to hardware platform 1000, and may or may not be wholly dependent on hardware platform 1000. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1042 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1032 may be in communication with other devices such as a keyboard/mouse 1038 (or other input devices such as a touch screen, trackball, etc.), communication devices 1040 (such as modems, network interface devices, peripheral interfaces such as PCI or PCIe, or other types of communication devices that may communicate through a network), audio I/O 1042, and/or accelerators 1046. In alternative embodiments, any portions of the bus architectures could be implemented with one or more PtP links.

Operating system 1006 may be, for example, Microsoft Windows, Linux, UNIX, Mac OS X, iOS, MS-DOS, or an embedded or real-time operating system (including embedded or real-time flavors of the foregoing). In some embodiments, a hardware platform 1000 may function as a host platform for one or more guest systems that invoke application (e.g., operational agents 1008).

Operational agents 1008 may include one or more computing engines that may include one or more non-transitory computer-readable mediums having stored thereon executable instructions operable to instruct a processor to provide operational functions. At an appropriate time, such as upon booting hardware platform 1000 or upon a command from operating system 1006 or a user or security administrator, a processor 1002 may retrieve a copy of the operational agent (or software portions thereof) from storage 1050 and load it into memory 1004. Processor 1002 may then iteratively execute the instructions of operational agents 1008 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1000 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1000 may be virtualized, in particular the processor(s) and memory. For example, a virtualized environment may run on OS 1006, or OS 1006 could be replaced with a hypervisor or virtual machine manager. In this configuration, a virtual machine running on hardware platform 1000 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 10 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 11. Such an SoC (and any other hardware platform disclosed herein) may include analog, digital, and/or mixed-signal, RF, or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 11:
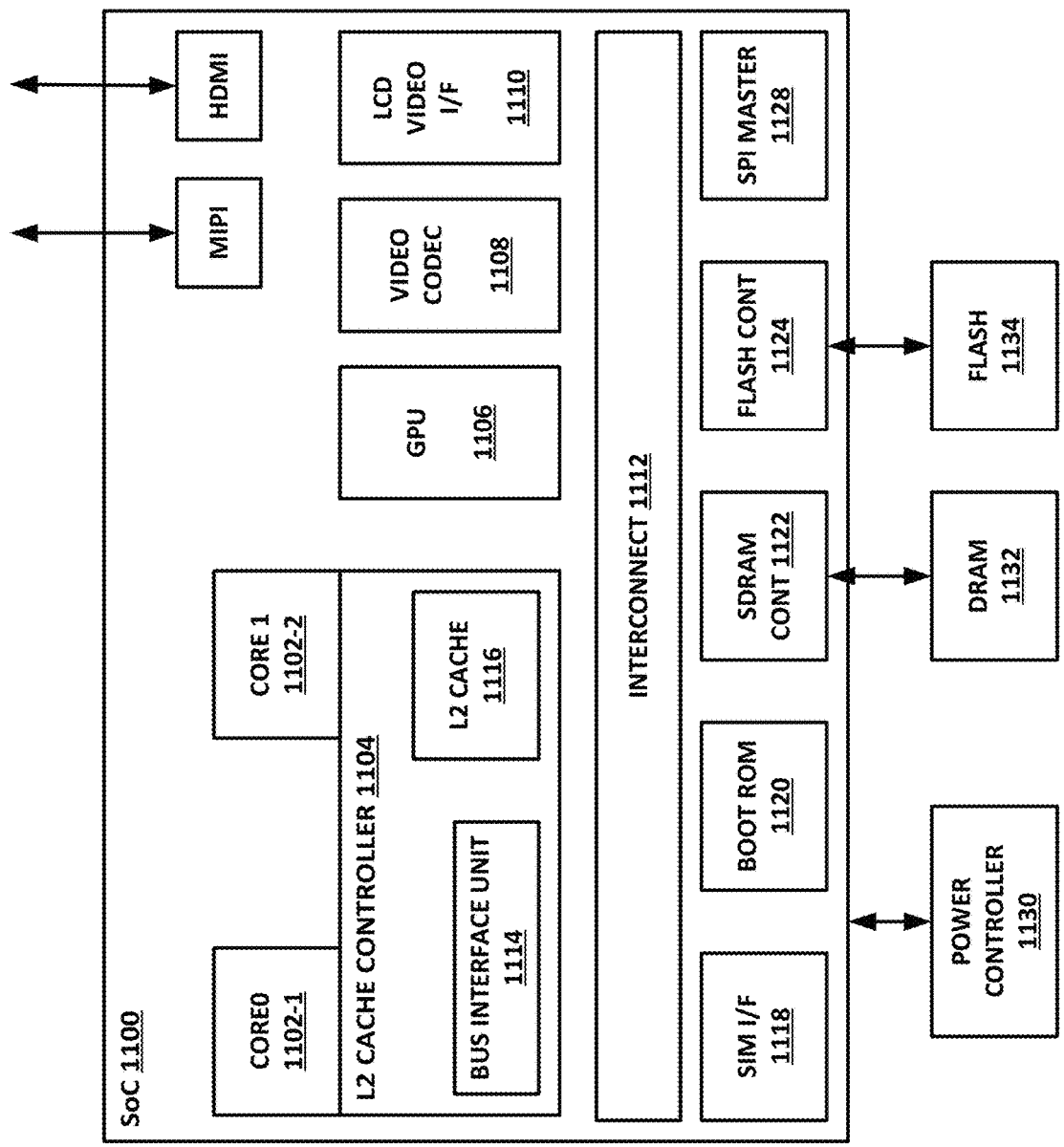
FIG. 11 is a block diagram illustration of selected elements of a system-on-a-chip (SoC).

FIG. 11 is a block diagram illustration of selected elements of an example SoC 1100. In at least some embodiments, SoC 1100 may be configured or adapted to provide notification of listening devices, according to the teachings of the present specification.

At least some of the teachings of the present specification may be embodied on an SoC 1100, or may be paired with an SoC 1100. SoC 1100 may include, or may be paired with, an advanced reduced instruction set computer machine (ARM) component. For example, SoC 1100 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1100 could also be integrated into, for example, a PC, server, video processing components, laptop computer, notebook computer, netbook, or touch-enabled device.

As with hardware platform 1000 above, SoC 1100 may include multiple cores 1102-1 and 1102-2. In this illustrative example, SoC 1100 also includes an L2 cache control 1104, a GPU 1106, a video codec 1108, a liquid crystal display (LCD) I/F 1110 and an interconnect 1112. L2 cache control 1104 can include a bus interface unit 1114, a L2 cache 1116. Liquid crystal display (LCD) I/F 1110 may be associated with mobile industry processor interface (MIPI)/HDMI links that couple to an LCD.

SoC 1100 may also include a subscriber identity module (SIM) I/F 1118, a boot ROM 1120, a synchronous dynamic random access memory (SDRAM) controller 1122, a flash controller 1124, a serial peripheral interface (SPI) master 1128, a suitable power control 1130, a dynamic RAM (DRAM) 1132, and flash 1134. In addition, one or more embodiments include one or more communication capabilities, interfaces, and features such as instances of Bluetooth, a 3G modem, a GPS, and an 802.11 Wi-Fi.

Designers of integrated circuits such as SoC 1100 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 12 is a block diagram illustration of selected elements of a processor 1200. In at least some embodiments, processor 1200 may be configured or adapted to provide notification of listening devices, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1200 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple VMs are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1200 includes one or more processor cores 1202, including core 1202-1-1202-N. Cores 1202 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1200 may include at least one shared cache 1230, which may be treated logically as part of memory 1240. Memory 1240 may include executable instructions 1242, as illustrated. Caches 1230 may be filled according to known caching techniques, and may store instructions and/or data that may be used by one or more components of processor 1200.

Processor 1200 may include an integrated memory controller (MC) 1234, to communicate with memory 1240. Memory controller 1234 may include logic and circuitry to interface with memory 1240, and may also include a cache controller to handle filling and evicting instructions and data to and from cache 1230.

By way of example, each core 1202 may include front-end logic 1206, execution logic 1214, and backend logic 1218.

In the illustrated embodiment, front-end logic 1206 includes an instruction decoder or decoders 1208, register renaming logic 1210, and scheduling logic 1212. Decoder 1208 may decode instructions received. Register renaming logic 1210 may provide register renaming, for example to facilitate pipelining. Scheduling logic 1212 may schedule instruction execution, and may provide out-of-order (OOO) execution. Front-end logic 1206 may fetch incoming instructions, perform various processing (e.g., caching, decoding, branch predicting, etc.), and pass instructions to execution logic 1214.

Execution logic 1214 includes one or more execution units 1216-1-1216-N. Execution units 1216 may include hardware instructions and microcode to carry out the provided instructions.

Backend logic 1218 includes retirement logic 1220. Core 1202 may provide for speculative execution of instructions, branch prediction, and similar. Retirement logic 1220 may be configured to determine which predicted instructions were actually needed by the program flow.

Processor 1200 may also include a PtP controller 1232, which enables connection to an uncore, chipset, Northbridge, Southbridge, or bus, by way of example.

Figure 13:
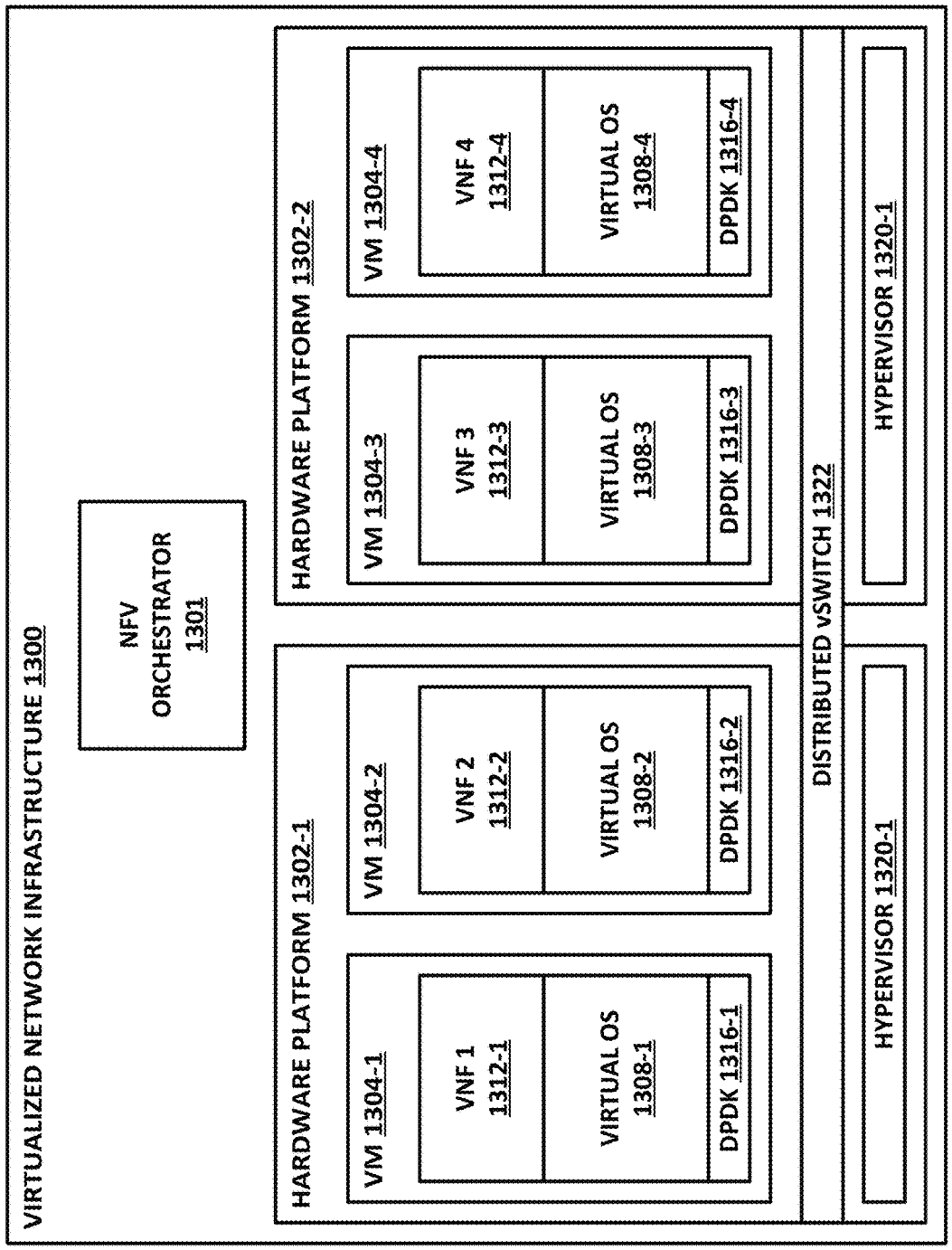
FIG. 13 is a block diagram of selected elements of a network function virtualization (NFV) infrastructure.

FIG. 13 is a block diagram illustration of a network function virtualization (NFV) infrastructure 1300. In at least some embodiments, notification of listening devices according to the teachings of the present specification may be provided within NFV infrastructure 1300.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1300. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 13, an NFV orchestrator 1301 manages a number of the VNFs 1312 running on an NFVI 1300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1301 a valuable system resource. Note that NFV orchestrator 1301 may provide a browser-based or graphical configuration interface, and in some embodiments may be integrated with SDN orchestration functions.

Note that NFV orchestrator 1301 itself may be virtualized (rather than a special-purpose hardware appliance). NFV orchestrator 1301 may be integrated within an existing SDN system, wherein an operations support system (OSS) manages the SDN. This may interact with cloud resource management systems (e.g., OpenStack) to provide NFV orchestration. An NFVI 1300 may include the hardware, software, and other infrastructure to enable VNFs to run. This may include a hardware platform 1302 on which one or more VMs 1304 may run. For example, hardware platform 1302-1 in this example runs VMs 1304-1 and 1304-2. Hardware platform 1302-2 runs VMs 1304-3 and 1304-4. Each hardware platform may include a hypervisor 1320, virtual machine manager (VMM), or similar function, which may include and run on a native (bare metal) operating system, which may be minimal so as to consume very few resources.

Hardware platforms 1302 may be or comprise a rack or several racks of blade or slot servers (including, e.g., processors, memory, and storage), one or more data centers, other hardware resources distributed across one or more geographic locations, hardware switches, or network interfaces. An NFVI 1300 may also include the software architecture that enables hypervisors to run and be managed by NFV orchestrator 1301.

Running on NFVI 1300 are a number of VMs 1304, each of which in this example is a VNF providing a virtual service appliance. Each VM 1304 in this example includes an instance of the Data Plane Development Kit (DPDK), a virtual operating system 1308, and an application providing the VNF 1312.

Virtualized network functions could include, as nonlimiting and illustrative examples, firewalls, intrusion detection systems, load balancers, routers, session border controllers, DPI services, network address translation (NAT) modules, or call security association.

The illustration of FIG. 13 shows that a number of VNFs 1304 have been provisioned and exist within NFVI 1300. This FIGURE does not necessarily illustrate any relationship between the VNFs and the larger network, or the packet flows that NFVI 1300 may employ.

The illustrated DPDK instances 1316 provide a set of highly-optimized libraries for communicating across a virtual switch (vSwitch) 1322. Like VMs 1304, vSwitch 1322 is provisioned and allocated by a hypervisor 1320. The hypervisor uses a network interface to connect the hardware platform to the data center fabric (e.g., an HFI). This HFI may be shared by all VMs 1304 running on a hardware platform 1302. Thus, a vSwitch may be allocated to switch traffic between VMs 1304. The vSwitch may be a pure software vSwitch (e.g., a shared memory vSwitch), which may be optimized so that data are not moved between memory locations, but rather, the data may stay in one place, and pointers may be passed between VMs 1304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1322 is illustrated, wherein vSwitch 1322 is shared between two or more physical hardware platforms 1302.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a transceiver; a local user display; and instructions encoded within the memory to instruct the processor to: locate via the transceiver at least one nearby device; receive observational profile information for the nearby device; and display on the local user display information about the nearby device's observation abilities.

There is further disclosed an example computing apparatus, wherein the observational profile information comprises information on the nearby device's ability to listen in on ambient conversation.

There is further disclosed an example computing apparatus, wherein the observational profile information comprises information on the nearby device's ability to visually observe ambient activity.

There is further disclosed an example computing apparatus, wherein the transceiver is a low-power transceiver.

There is further disclosed an example computing apparatus, wherein the low-power transceiver is a low-power Bluetooth transceiver.

There is further disclosed an example computing apparatus, wherein the user display includes an augmented reality view.

There is further disclosed an example computing apparatus, wherein the user display includes a list view.

There is further disclosed an example computing apparatus, wherein locating the at least one nearby device comprises receiving a device identifier from the nearby device.

There is further disclosed an example computing apparatus, wherein receiving the observational profile information further comprises querying a cloud service for observational capabilities of the self-reported device identifier.

There is further disclosed an example computing apparatus, wherein the device identifier is self-reported.

There is further disclosed an example computing apparatus, wherein receiving observational profile information from the nearby device comprises receiving self-reported observational profile information from the nearby device.

There is further disclosed an example computing apparatus, wherein the instructions are further to supplement the self-reported observational profile information with data from a cloud service.

There is also disclosed an example of one or more tangible, non-transitory computer-readable storage media having stored thereon instructions to: enumerate nearby devices with latent observation abilities; build for the nearby devices individual latent observation profiles; and display the latent observation profiles to a user.

There is further disclosed an example of one or more tangible, non-transitory computer-readable storage media, wherein the latent observation profiles comprise information on the nearby devices' ability to listen in on ambient conversation.

There is further disclosed an example of one or more tangible, non-transitory computer-readable storage media, wherein the latent observation profile information comprises information on the nearby devices' ability to visually observe ambient activity.

There is further disclosed an example of one or more tangible, non-transitory computer-readable storage media, wherein enumerating nearby devices comprises enumerating the nearby devices via a wireless transceiver.

There is further disclosed an example of one or more tangible, non-transitory computer-readable storage media, wherein the wireless transceiver is a low-power transceiver.

There is further disclosed an example of one or more tangible, non-transitory computer-readable storage media, wherein the low-power transceiver is a low-power Bluetooth transceiver.

There is further disclosed an example of one or more tangible, non-transitory computer-readable storage media, wherein displaying the latent observation profiles comprises providing an augmented reality view.

There is further disclosed an example of one or more tangible, non-transitory computer-readable storage media, wherein displaying the latent observation profiles comprises providing a list view.

There is further disclosed an example of one or more tangible, non-transitory computer-readable storage media, wherein displaying the latent observation profiles to the comprises providing a hybrid list/augmented reality view.

There is further disclosed an example of one or more tangible, non-transitory computer-readable storage media, wherein enumerating the nearby devices with latent observation abilities comprises receiving device identifiers from the nearby devices.

There is further disclosed an example of one or more tangible, non-transitory computer-readable storage media, wherein building individual latent observation profiles comprises receiving device identifiers for the nearby devices, determining that at least some devices did not self-report an observational profile, and querying a cloud service for observational capabilities for the devices that did not self-report an observational profile.

There is further disclosed an example of one or more tangible, non-transitory computer-readable storage media, wherein building individual latent observation profiles for the nearby devices comprises receiving self-reported observational ability or activity information from the nearby devices.

There is further disclosed an example of one or more tangible, non-transitory computer-readable storage media, wherein the instructions are further to supplement the self-reported observational profile information with information from a cloud service.

There is also disclosed an example computer-implemented method of notifying a user of latent observation capable devices, comprising: operating a transceiver to identify nearby devices with latent observation capabilities; building latent observation profiles for the nearby devices; and displaying to the user a notification screen including information on nearby devices with latent observation capabilities, based on the latent observation profiles.

There is further disclosed an example method, wherein the latent observation profiles further comprise information on the nearby devices' ability to listen in on ambient conversation.

There is further disclosed an example method, wherein the latent observation profiles further comprise information on the nearby devices' ability to visually observe ambient activity.

There is further disclosed an example method, wherein the transceiver is a low-power transceiver.

There is further disclosed an example method, wherein the low-power transceiver is a low-power Bluetooth transceiver.

There is further disclosed an example method, wherein the notification screen includes an augmented reality view.

There is further disclosed an example method, wherein the notification screen includes a list view.

There is further disclosed an example method, wherein the notification screen includes a hybrid view.

There is further disclosed an example method, wherein identifying nearby devices with latent observation capabilities comprises receiving device identifiers from the nearby devices.

There is further disclosed an example method, wherein building latent observation profiles for the nearby devices comprises querying a cloud service for observation capabilities for one or more devices that did not self-report observation capabilities.

There is further disclosed an example method, wherein the device identifiers are self-reported.

There is further disclosed an example method, wherein building latent observation profiles for the nearby devices comprises receiving self-reported observational profile information from the nearby devices.

There is further disclosed an example method, further comprising supplementing the self-reported observational profile information with information from a cloud service.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus to warn a user of eavesdropping devices, comprising:
a hardware platform comprising a processor circuit and a memory;
a transceiver;
a local user display; and
instructions encoded within the memory to instruct the processor circuit to:
locate via the transceiver a nearby device;
determine profile information for the nearby device, the profile information including information on an ability of the nearby device to collect ambient audio and/or video data; and
display on the local user display an identifier of the nearby device including a device type, a warning that the nearby device may eavesdrop on the user without authorization from the user, and a time span in which the nearby device may have eavesdropped.

2. The computing apparatus of claim 1, wherein the instructions are further to display information on a nearby device's ability to listen in on ambient conversation.

3. The computing apparatus of claim 1, wherein instructions are further to display information on a nearby device's ability to visually observe ambient activity.

4. The computing apparatus of claim 1, wherein the transceiver is a low-power transceiver.

5. The computing apparatus of claim 4, wherein the low-power transceiver is a low-power Bluetooth transceiver.

6. The computing apparatus of claim 1, wherein the local user display includes an augmented reality view.

7. The computing apparatus of claim 1, wherein the local user display includes a list view.

8. The computing apparatus of claim 1, wherein locating the nearby device comprises receiving a device identifier from the nearby device.

9. The computing apparatus of claim 8, wherein the device identifier is a self-reported device identifier.

10. The computing apparatus of claim 9, wherein the instructions are further to query a cloud service for observational capabilities of the self-reported device identifier.

11. The computing apparatus of claim 1, wherein receiving profile information from the nearby device comprises receiving self-reported profile information from the nearby device.

12. The computing apparatus of claim 11, wherein the instructions are further to supplement the self-reported profile information with data from a cloud service.

13. One or more tangible, non-transitory computer-readable storage media having stored thereon instructions to:
enumerate nearby devices with latent observation abilities, wherein the nearby devices are near an endpoint operated by a user;
build, for the nearby devices respective individual latent observation profiles, including information about the nearby devices' ability to collect ambient audio and/or video data; and display one or more latent observation profiles to a user, wherein a latent observation profile comprises an identifier of a device including a device type, a warning that the device may eavesdrop on the user without authorization from the user, and a time span in which the device may have eavesdropped.

14. The one or more tangible, non-transitory computer-readable storage media of claim 13, wherein the one or more latent observation profiles comprise information on the nearby devices' ability to listen in on ambient conversation.

15. The one or more tangible, non-transitory computer-readable storage media of claim 14, wherein the one or more latent observation profiles comprise information on the nearby devices' ability to visually observe ambient activity.

16. The one or more tangible, non-transitory computer-readable storage media of claim 13, wherein displaying the one or more latent observation profiles to the user comprises providing an augmented reality view.

17. The one or more tangible, non-transitory computer-readable storage media of claim 13, wherein displaying the one or more latent observation profiles to the user comprises providing a list view.

18. The one or more tangible, non-transitory computer-readable storage media of claim 13, wherein displaying the one or more latent observation profiles to the user comprises providing a hybrid list/augmented reality view.

19. A computer-implemented method of notifying a user of latent observation capable devices, comprising:

operating a transceiver to identify nearby devices with latent observation capabilities, including devices with an ability to collect ambient audio and/or video data;

building latent observation profiles for the nearby devices; and displaying to the user a notification screen including identification of nearby device that may be using latent observation capabilities to eavesdrop on the user, including a device type, a warning that the device may collect audio and/or video data, and a time span in which the device may have eavesdropped on the user.

20. The method of claim 19, wherein the notification screen includes an augmented reality view.

* * * * *